(12) United States Patent
Chen et al.

(10) Patent No.: US 8,895,481 B2
(45) Date of Patent: Nov. 25, 2014

(54) VISCOELASTIC SURFACTANT ACID TREATMENT

(75) Inventors: Yiyan Chen, Sugar Land, TX (US); Abbas Mahdi, Calgary (CA); Richard Marcinew, Calgary (CA); Matt Graham, Calgary (CA); Timothy L. Pope, Cheyenne, WY (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/643,522

(22) Filed: Dec. 21, 2009

(65) Prior Publication Data

US 2011/0152135 A1 Jun. 23, 2011

(51) Int. Cl.
C09K 8/74 (2006.01)
C23F 11/04 (2006.01)
C23F 11/14 (2006.01)

(52) U.S. Cl.
CPC ............. *C23F 11/04* (2013.01); *C09K 2208/30* (2013.01); *C09K 8/74* (2013.01); *C23F 11/141* (2013.01)
USPC ........... 507/224; 507/219; 507/221; 507/244; 507/269; 166/308.1

(58) Field of Classification Search
None
See application file for complete search history.

(56) References Cited

U.S. PATENT DOCUMENTS

| | | |
|---|---|---|
| 3,929,191 A | 12/1975 | Graham |
| 4,585,064 A | 4/1986 | Graham et al. |
| 4,591,447 A | 5/1986 | Kubala |
| 4,695,389 A | 9/1987 | Kubala |
| 5,147,907 A | 9/1992 | Rinck et al. |
| 5,422,183 A | 6/1995 | Sinclair et al. |
| 5,574,124 A | 11/1996 | Schmalstieg et al. |
| 5,760,154 A | 6/1998 | Krause et al. |
| 6,068,056 A * | 5/2000 | Frenier et al. .................. 166/307 |
| 6,207,780 B1 | 3/2001 | Stockhausen et al. |
| 6,929,070 B2 * | 8/2005 | Fu et al. ...................... 166/308.2 |
| 7,028,775 B2 * | 4/2006 | Fu et al. ...................... 166/308.2 |
| 7,320,952 B2 | 1/2008 | Chen et al. |
| 7,341,980 B2 | 3/2008 | Lee et al. |
| 7,345,012 B2 | 3/2008 | Chen et al. |
| 7,378,378 B2 | 5/2008 | Chen et al. |
| 7,387,986 B2 | 6/2008 | Chen et al. |
| 7,387,987 B2 | 6/2008 | Chen et al. |
| 7,402,549 B2 | 7/2008 | Chen et al. |
| 7,507,693 B2 | 3/2009 | Chen et al. |
| 7,575,054 B2 | 8/2009 | Fuller et al. |
| 7,942,215 B2 * | 5/2011 | Huang et al. ..................... 175/64 |
| 2003/0139298 A1 * | 7/2003 | Fu et al. ........................ 507/200 |
| 2005/0124500 A1 * | 6/2005 | Chen et al. .................... 507/200 |
| 2006/0042797 A1 * | 3/2006 | Fredd et al. ................... 166/282 |

(Continued)

FOREIGN PATENT DOCUMENTS

WO  WO 9856497 A1 * 12/1998

*Primary Examiner* — John J Figueroa
(74) *Attorney, Agent, or Firm* — Jeremy D. Tillman; Rachel E. Greene; Tim Curington (57) ABSTRACT

A method of treating a subterranean formation penetrated by a wellbore involves introducing an acid treatment fluid through the wellbore into the formation. The treatment fluid is formed from a zwitterionic viscoelastic surfactant, an acid in an amount to provide the treatment fluid with an initial pH of ≤0 and a rheology enhancer. The treatment fluid has a high viscosity at the initial pH and a lower viscosity when the pH of the treatment fluid is raised to an intermediate pH of from greater than 0 to about 5.

21 Claims, 2 Drawing Sheets

(56) References Cited

U.S. PATENT DOCUMENTS

2006/0063681 A1* 3/2006 Christanti et al. ............ 507/203
2006/0081370 A1* 4/2006 Fu et al. ........................ 166/279
2006/0102349 A1* 5/2006 Brady et al. .................. 166/282
2007/0235189 A1* 10/2007 Milne et al. ................ 166/280.1
2008/0139412 A1* 6/2008 Fuller ........................... 507/219
2010/0071957 A1* 3/2010 Huang et al. .................... 175/65

* cited by examiner

VISCOELASTIC SURFACTANT ACID TREATMENT

BACKGROUND

The statements in this section merely provide background information related to the present disclosure and may not constitute prior art.

In the construction and development of wells formed in subterranean formations, such as wells for the production of oil and gas, various operations are carried out that require the introduction of fluids of different types into the wellbore and/or into formation surrounding the wellbore.

In acid-fracturing jobs, for instance, it is desirable to pump a gelled fluid to create the fracture initially for the acid treatment. Compared to a simple non-gelled acid treatment, the gelled fluid facilitates the creation of wider and longer fractures for the acid to etch. Additionally, by gelling the acid, this also limits acid leak-off into the formation, thus providing more effective use of the acid. The gel also reduces the acid contact with the formation by limiting worm-hole development, thereby slowing the acid reaction so that the acid has a better chance to penetrate into the fracture before reacting. This facilitates the transport of live acid to the fracture tip, increasing the effectiveness of the stimulation.

Some of the current practices of acid fracturing involve pumping a pad fluid formed from a hydratable polymer that is crosslinked to form a gel, which is then followed by the acid treatment. The treatment may involve alternating between pumping the polymer gel and acid to achieve the desired etched fracture, and resulting fracture conductivity. Such operations utilizing alternating stages of polymer gel and acid may be complicated and damage to the formation by the polymer gel.

In certain applications, gelled acid systems that are gelled with polymeric materials have been used. In polymer gelled acid systems, the viscosities are usually not very high, and temperature stability can be a problem. Furthermore, the polymer of the gelled acid system is difficult to remove, and can still damage the formation.

Viscoelastic surfactants (VES) have been used in fluids for many well treatment operations. Viscoelastic surfactants can be used to provide a high viscosity or gelled fluid and can be readily removed from the formation so that they do not damage the formation the way polymer systems can. Not to be limited by theory, but viscoelastic surfactant systems under proper conditions form long rod-like or worm-like micelles in aqueous solution. Entanglement of these micelle structures provides viscosity and elasticity to the fluid. When these fluids are subjected to shear, the shear disrupts the micelle network so that the fluids exhibit shear-thinning behavior. When the shear rate is eliminated, or reduced, the apparent viscosity of the fluid recovers as the VES micelle network reassembles.

Viscoelastic surfactant acid systems have also been developed. In particular, viscoelastic diverting acids (VDA's) have been used in many formation treatments. VDA's do not have much viscosity before the acid is spent, however, and thus may not be used as a gel system for fracturing. Alternatively, a polymer pad may be used in some VDA treatments. The use of a polymer pad may defeat the benefit of the VDA, however, because it is no longer a polymer-free system.

Accordingly, a gelled acid system that utilizes viscoelastic surfactants would be of great benefit in the treating of subterranean formations in oil and gas production, particularly for use in acid fracturing.

SUMMARY

A method of treating a subterranean formation penetrated by a wellbore is disclosed. The method includes introducing an acid treatment fluid through the wellbore into the formation. The treatment fluid comprises a zwitterionic viscoelastic surfactant, an acid in an amount to provide the treatment fluid with an initial pH of ≤0 and a rheology enhancer. The treatment fluid is characterized by having a high viscosity at the initial pH and being further characterized by a lower viscosity when the pH of the treatment fluid is raised to an intermediate pH of from greater than 0 to about 5.

In certain embodiments, the treatment fluid is further characterized by an increase in viscosity from the low viscosity when the pH of the treatment fluid is raised from the intermediate pH to a pH of from about 5 or more. The pH may be increased to the intermediate pH due to acid spending.

In certain embodiments, the zwitterionic viscoelastic surfactant may be a surfactant or mixture of surfactants having the formula:

wherein R is an alkyl group that contains from about 17 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and $CH_2CH_2O$ may also be $OCH_2CH_2$.

In certain embodiments, the zwitterionic surfactant may have the betaine structure:

wherein R is a hydrocarbon group that may be branched or straight chained, aromatic, aliphatic or olefinic and has from about 14 to about 26 carbon atoms and may contain an amine; n=about 2 to about 4; and p=1 to about 5, and mixtures of these compounds.

The rheology enhancer may be selected from at least one of a polyvinyl ester, a polyvinyl acetate, a polyacrylate and a sulfonate-containing polymer, and combinations thereof.

In certain applications, the treatment fluid is introduced into the wellbore at a pressure above the fracture pressure of the formation. The zwitterionic viscoelastic surfactant may be present in the treatment fluid in an amount of from about 0.5% or more.

In certain instances, the treatment fluid may have a viscosity of at least 50 mPa·s at a shear rate of 100 s$^{-1}$ at the initial pH. Further, the treatment fluid, in some embodiments, may be characterized by at least one of (1) and (2), wherein (1) is a viscosity at the intermediate pH of less than about 20 mPa·s at a shear rate of 100 s$^{-1}$, and (2) is the viscosity at the intermediate pH is decreased by as much as 70% or more compared to the high viscosity of the fluid at the initial pH.

The acid used may be a mineral acid, and in particular, the acid used may be hydrochloric acid. The hydrochloric acid may be present in the treatment fluid in an amount of greater than 10% by weight of the treatment fluid. The treatment fluid may further contain at least one of proppant particles, fibers, particulates and a gas component.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

The description and examples are presented solely for the purpose of illustrating the different embodiments of the invention and should not be construed as a limitation to the scope and applicability of the invention. While any compositions of the present invention may be described herein as comprising certain materials, it should be understood that the composition could optionally comprise two or more chemically different materials. In addition, the compositions can also comprise some components other than the ones already cited. While the invention may be described in terms of treatment of vertical wells, it is equally applicable to wells of any orientation, including horizontal. The invention may be described for hydrocarbon production wells, but it is to be understood that the invention may be used for wells for production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

It has been discovered that certain viscoelastic surfactant systems can be prepared that provide a highly viscous fluid, or gelled viscosity at a high acid concentration, such that they are useful in applications that call for a gelled acid, such as in acid fracturing, for treating subterranean formations. Such systems may include little if any polymers that are often used in gelled fluids that could otherwise damage the formation.

The viscoelastic surfactant systems make use of zwitterionic viscoelastic surfactants. Zwitterionic surfactants are surfactants that can carry a zero net charge so that surfactant molecule is essentially neutral. Particularly useful zwitterionic surfactants may include betaine surfactants. The zwitterionic surfactant may have a cationic functional group and an anionic functional group that each carry positive and negative charges, respectively, to provide the net zero or neutral charge. The zwitterionic surfactant may include those that carry an amine functional group as part of the middle part of the hydrophilic head. The described zwitterionic viscoelastic surfactant when used with particular rheology modifiers or enhancers provides unique properties depending upon the acid concentration of the fluid.

The following illustrates an example of how the acid concentration affects aqueous fluids containing the zwitterionic viscoelastic surfactant. When fluids containing a zwitterionic viscoelastic surfactant incorporating a quaternary amine as the cationic functional group of the hydrophilic head are in an acidic environment so that the pH of the fluid is at an intermediate range of from greater than 0 to about 5, the VES is water soluble and does not gel or form worm-like micelles that contribute to the viscous properties of VES fluids. At higher acid concentrations that provide a pH≤0, however, the VES fluid gels or becomes viscoelastic. When the fluid containing the VES is raised to a neutral pH or a pH at 5 or more, such as may occur as the acid within the fluid is spent, the fluid becomes gelled or viscous again. At such neutral conditions, the fluid will gel in water regardless of salt concentration.

Not to be limited by theory, but it is believed that at extremely low pH (i.e. pH≤0), both ionic functional groups on the surfactant head are positively charged. The quaternary amine group has a permanent positive charge and the carboxylic group are also protonated to give —$COOH_2$. At the intermediate pH level of from greater than 0 to about 5, the surfactants form spherical micelles, or other well dispersed micro-structures, in water that do not readily interact. In this state, macroscopically the gel appears to break. Upon further increasing of the pH of the fluid to a pH of from about 5 or more, the net charge of the VES becomes neutral so that the VES acts like a normal zwitterionic viscoelastic surfactant and associates into worm-like micelles.

Viscoelastic surfactants have been useful in viscoelastic diverting acids used in matrix acid treatments where the viscosity is initially low at high acid conditions. This initial low viscosity facilitates pumping and penetration of the acidizing fluid into the formation. As the acid reacts, such as at the tip of wormhole created by the acid, the viscosity increases. This facilitates diverting the acid treatment fluid from those areas where the acid has reacted with the formation into areas that have not been treated with the acid.

A viscous acid treatment fluid can be formed that has an initially high concentration of acid and an initially high or gelled viscosity. As used herein, the expressions "viscous," "viscoelastic," "gel," "gelled" or similar expressions used in reference to the treatment fluid are meant to encompass the situation where the viscoelastic surfactant structures have aggregated to impart viscosity or gelled characteristic to the fluid. In certain applications, the gelled treatment fluid may have an apparent viscosity of 10 mPa·s, 20 mPa·s, 30 mPa·s, 40 mPa·s, 50 mPa·s, 100 mPa·s or more, all at a shear rate of 100 $s^{-1}$, when at a pH of ≤0. Variations in the gelled viscosity may depend upon the amount of VES used, types and amounts of rheology modifiers and other additives used, the particular pH level (i.e. pH≤0), fluid temperatures, etc.

At the intermediate pH level of from greater than 0 to about 5, when the VES acid fluid breaks, the viscosity of the fluid may be less than about 10 mPa·s or 20 mPa·s at a shear rate of 100 $s^{-1}$ in certain applications. In certain applications, the viscosity of the fluid may be decreased by as much as 70%,

80%, 90% or more compared to the initial high viscosity of the fluid when the pH level is ≤0.

Zwitterionic viscoelastic surfactants may include betaines and contain a quaternary amine functional group. The zwitterionic surfactant may have the general structure of Formula (1) below:

$$R_1C(O)N(R_2)(R_3)(R_4Y) \tag{1}$$

in which $R_1$ is a hydrocarbyl group that may be branched or straight chained, aromatic, aliphatic or olefinic and contains from about 14 to about 26 carbon atoms and may include an amine; $R_2$ and $R_3$ are each a hydrogen or an alkyl group having from 1 to about 4 carbon atoms; $R_4$ is a hydrocarbyl group having from 1 to about 5 carbon atoms; and Y is —COO⁻ or —COOH.

In certain specific embodiments, the zwitterionic formula may have the betaine structure of Formula (2) below:

(2)

in which R is a hydrocarbyl group that may be branched or straight chained, aromatic, aliphatic or olefinic and has from about 14 to about 26 carbon atoms and may contain an amine; n=about 2 to about 4; and p=1 to about 5. Mixtures of these compounds may be used.

In certain specific embodiments, the zwitterionic formula may have the structure of Formula (3) below:

in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and $CH_2CH_2O$ may also be $OCH_2CH_2$.

Two suitable examples of particularly useful betaines are BET-0 and BET-E. The surfactant in BET-O-30 is shown below; one chemical name is oleylamidopropyl betaine. It is designated BET-O-30 because as obtained from the supplier (Rhodia, Inc., Cranbury, N.J., U.S.A.) it is called Mirataine BET-O-30 because it contains an oleyl acid amide group (including a $C_{17}H_{33}$ alkene tail group) and contains about 30% active surfactant. The remainder is substantially water, sodium chloride, and propylene glycol. The surfactant in BET-O-30 is shown in Formula (4) below:

Formula 4 - Surfactant in BET-O-30 (when n = 3 and p = 1)

An analogous material, BET-E-40, also available from Rhodia, Inc., contains an erucic acid amide group (including a $C_{21}H_{41}$ alkene tail group) and is approximately 40% active ingredient, with the remainder being substantially water, sodium chloride, and isopropanol. The surfactant in BET-E-40 is shown in Formula (5) below:

Formula 5 - Surfactant in BET-E-40 (when n = 3 and p = 1)

One chemical name for this surfactant is erucylamidopropyl betaine. As-received concentrate of BET-E-40 was used in the experiments described later on. BET surfactants, and other VES's are described in U.S. Pat. No. 6,258,859, which is incorporated herein by reference. Mixtures of betaines, especially BET-E-40 with other surfactants, may also be suitable.

The zwitterionic viscoelastic surfactant may be used in the acid treatment fluid at a concentration of from about 0.5% or more by weight of the treatment fluid. In many applications, the amount will range from about 0.5% to about 10% by weight of the treatment fluid, more particularly from about 1% to about 8% by weight of the treatment fluid. In certain embodiments, the amount of VES may be used in an amount of less than 7.5% or 6% by weight of the treatment fluid.

The acid used with the treatment fluids is typically a mineral acid or Lewis acid. For most applications, hydrochloric acid is used for the treatment fluid. Other acids that may be used may include sulfuric acid, nitric acid, etc. Certain organic acids, such as sulfonic acid (e.g. mathanesulfonic acid), etc. may also be used. A combination of acids may also be used. The acids are used in an amount to give the required pH, as discussed above. In certain applications, the acid may be present in an amount of about 7.5% to about 20% or more by weight of the treatment fluid. In certain applications, the acid is present in an amount of from about 10% to about 15% by weight of the treatment fluid.

The acids described may constitute formation-dissolving materials to facilitate dissolving of the formation materials. Other formation-dissolving materials may also be used to facilitate treatment of the formation. Such formation dissolving materials include various organic acids and chelating agents. Examples of suitable chelating agents include ethylenediamine tetraacetic acid (EDTA), nitrilotriacetic acid (NTA), hydroxyethyl ethylenediamine triacetic acid (HEDTA), etc. The initial concentration of the acid in the treatment fluid may vary.

The zwitterionic surfactant viscoelastic systems may also contain one or more members of the group consisting of organic acids, organic acid salts, inorganic salts, and oligomers, polymers, co-polymers, and mixtures of these members. This member is typically present in only a minor amount and need not be present at all. The organic acid is typically a sulfonic acid or a carboxylic acid and the anionic counter-ion of the organic acid salts are typically sulfonates or carboxylates. Representative of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Examples include salicylate, phthalate, p-toluene sulfonate, hydroxynaphthalene carboxylates, such as 5-hydroxy-1-naphthoic acid, 6-hydroxy-1-naphthoic acid, 7-hydroxy-1-naphthoic acid, 1-hydroxy-2-naphthoic acid,

3-hydroxy-2-naphthoic acid, 5-hydroxy-2-naphthoic acid, 7-hydroxy-2-naphthoic acid, and 1,3-dihydroxy-2-naphthoic acid and 3,4-dichlorobenzoate. The organic acid or salt thereof may aid the development of increased viscosity that is characteristic of fluids. The organic acid or salt thereof is typically present in the zwitterionic viscoelastic fluid (after the viscoelastic surfactant has concentrated sufficiently to viscosify the fluid) at a weight concentration of from about 0.01% to about 10% by weight based upon total weight of treatment fluid, more typically from about 0.01% to about 7% by weight based upon total weight of treatment fluid, and even from about 0.01% to about 6% by weight based upon total weight of treatment fluid.

Inorganic salts that are particularly suitable for use in the zwitterionic viscoelastic fluid include water-soluble potassium, sodium, and ammonium salts, such as potassium chloride and ammonium chloride. Additionally, calcium chloride, calcium bromide and zinc halide salts may also be used. The inorganic salts may aid in the development of increased viscosity which is characteristic of the fluids. Further, the inorganic salt may assist in maintaining the stability of a geologic formation to which the fluid is exposed. Formation stability and in particular clay stability (by inhibiting hydration of the clay) is achieved at a concentration level of a few percent by weight. The inorganic salt is typically present in the zwitterionic viscoelastic fluid (after the viscoelastic surfactant has concentrated sufficiently to viscosify the fluid) at a weight concentration of from about 0.1% to about 30% by weight based upon total weight of treatment fluid, more typically from about 0.1% to about 10% by weight based upon total weight of treatment fluid, and even more typically from about 0.1% to about 8% by weight based upon total weight of treatment fluid. Organic salts, e.g. trimethylammonium hydrochloride and tetramethylammonium chloride, may also be used in addition to, or as a replacement for, the inorganic salts. Optionally, these systems may be formed in dense brines, including brines containing polyvalent cations.

As an alternative to the organic salts and inorganic salts, or as a partial substitute therefore, one can use a medium to long chain alcohol, such as an alkanol. These may have five to ten carbon atoms. An alcohol ethoxylate may also be used, such as an alkanol ethoxylate. These may include alkanol ethoxylates having a 12 to 16 carbon alcohol and having 1-6 or, more particularly, 1-4 oxyethylene units.

Rheology enhancers may be used with the viscoelastic surfactants. These may be used to shorten the shear recovery time, to increase the viscosity of the VES fluid and/or provide greater tolerance to brines. Such materials are typically called co-surfactants, rheology modifiers, rheology enhancers, etc. The expression "rheology enhancer," however, shall be used herein to refer to such materials. Various rheology enhancers may be used. Examples of these rheology enhancers are described in U.S. Pat. Nos. 7,320,952; 7,341,980; 7,345,012; 7,378,378; 7,387,986; 7,387,987; 7,402,549 and 7,507,693, each of which is incorporated herein by reference. The rheology enhancers are typically alcohols, organic acids, such as carboxylic acids and sulfonic acids, sulfonates, and others, which may or may not contribute to the pH lowering of the fluid to effect. In particular, such materials may include polyvinyl esters, polyvinyl acetates, polyacrylates, polyvinyl alcohols and aromatic sulfonates. U.S. Pat. No. 6,258,859 describes the use of sodium dodecylbenzene sulfonate (SDBS) as a rheology enhancer. Still other suitable rheology enhancers include certain chelating agents such as trisodium hydroxyethylethylenediamine triacetate.

The rheology enhancer may be an amphiphilic material. Such materials are described in U.S. Pat. Nos. 7,320,952; 7,341,980; 7,345,012; 7,387,986 and 7,402,549. Such amphiphilic polymers have some polar groups on an otherwise water-insoluble backbone, or have side chains that themselves are water soluble backbones, and/or have some insoluble groups or segments on the backbone or on the side chain(s), or on both, so that the polymer is soluble in both water and organic solvents and have an affinity to both polar and non-polar solvents. For example, polymers or copolymers containing partially hydrolyzed polyvinyl acetates (PH-PVA's) consisting of or containing the following structure or structure segment of Formulas (6) and (7) below:

(6)

(7)

The polymers are typically abbreviated as in the first structure (6) shown, with [m/(n+m)]100=% hydrolysis, although actually having the hydrolyzed sites randomly distributed, as shown in the second structure (7). This structure is also sometimes known as partially hydrolyzed polyvinyl alcohol or as polyvinyl alcohol/polyvinyl acetate copolymer. Examples are available from Synthomer Limited, Harlow, Essex, United Kingdom, under the trade names Alcotex WD100 and Alcotex WD200. Alcotex WD200 is an aqueous solution containing approximately 20% of a copolymer containing polyvinyl acetate that is approximately 42-45% hydrolyzed, having an average molecular weight of about 25,000; it contains less than 2% methanol. Suitable partially hydrolyzed polyvinyl acetates (PHPVA's) or PHPVA-containing copolymers are from about 10% to about 95% hydrolyzed and have a molecular weight of from about 500 to about 100,000,000, more particularly, suitable PHPVA's or PHPVA-containing copolymers are from about 30% to about 88% hydrolyzed and have a molecular weight of from about 5000 to about 100,000,000. Other partially hydrolyzed polyvinyl esters (sometimes referred to as partially hydrolyzed polyvinyl alcohols) may be used, for example those obtained from $C_2$ to $C_{11}$ esters (i.e. the partially hydrolyzed ethyl to undecyl esters of polyvinyl alcohols). It should be understood that polymers is meant to include copolymers.

Other suitable amphiphilic polymers may include partially hydrolyzed polyacrylates, or partially hydrolyzed polymethacrylates or the like, for example, but not limited to, partially hydrolyzed polymethyl acrylate, partially hydrolyzed polyethyl acrylate, partially hydrolyzed polybutyl acrylate, partially hydrolyzed polymethyl methacrylate, and mixtures of these polymers. The rheology enhancer may also contain sulfonate-containing polymers, such as polystyrene sulfonates and condensation products of naphthalene sulfonates.

Other polymers that may be used as the rheology enhancer, or may be part of the amphiphilic polymeric rheology enhancer, include those described in U.S. Pat. No. 5,760,154 (except those containing polysaccharides) and U.S. Pat. No. 5,147,907 (the portion not containing dextrins), each of which is incorporated by reference. Also useful as part of all of the rheology enhancer are polymers shown in U.S. Pat. No. 5,574,124, incorporated herein by reference, (such as terpolymers of acrylic acid, maleic anhydride and vinyl acetate).

Also useful as part or all of the rheology enhancer are polymers shown in U.S. Pat. No. 6,207,780, incorporated herein by reference, (such as polymers built up of a) monoethylenically unsaturated dicarboxylic acids and/or their salts, b) monoethylenically unsaturated monocarboxylic acids and/or their salts, c) monounsaturated monomers which, after hydrolysis or saponification, can be converted into monomers having a hydroxyl group covalently bonded at the C—C-chain, d) monoethylenically unsaturated sulfonic acid groups or sulfate groups-containing monomers, and optionally e) further radically copolymerizable monomers).

The amphiphilic polymer or copolymer rheology enhancer may be linear, branched, or have a comb, dendritic, brush, graft, star or star-branched shape. It may contain repeating units other than vinyl esters, vinyl acrylates, and the corresponding hydrolysed groups. The other repeating units are, for example, polyethylene oxide/polyethylene glycol or polypropylene oxide/polypropylene glycol. The copolymers may be random, alternating, or block copolymers. The amount and type of rheology enhancer may be dependent upon the VES surfactant fluid system at a given concentration and temperature. The appropriate amounts of surfactant and rheology enhancer are those necessary to achieve the desired viscosity, stability and shear recovery time as may be determined by experiment at the acid concentrations described herein. The rheology enhancer may be used in the fluid system in similar amounts to those described in the patents referenced above. In certain embodiments, the amount of rheology enhancer may range from about 0.0001% to about 0.5%, for example from about 0.01% to about 0.25%.

The treatment fluids may be used with or without corrosion inhibitors. Typically a corrosion inhibitor will be used, however. The corrosion inhibitors may be used to prevent corrosion of the completion equipment downhole. Suitable corrosion inhibitors may include quaternary amines, organic bases (e.g. pyridine) and proton scavengers (e.g. triethylamine). Compounds containing ammonium quaternary moieties and sulfur compounds may be suitable as corrosion inhibitors, such as those described in U.S. Pat. No. 6,521,028, which is herein incorporated by reference. The corrosion inhibitors are usually used in an amount of from less than 0.5% or 1% by weight of the treatment fluid, more particularly from about 0.05% to 0.2% by weight of the treatment fluid.

The fluid may optionally contain chelating agents for polyvalent cations, for example aluminum, calcium and iron, to prevent their precipitation. In such cases the chelating agents are often called iron sequestering agents. Some of the formation-dissolving agents described previously are such chelating agents as well.

In acid fracturing, because flow channels are created by dissolving formation materials of the fractured materials, proppant materials that are typically used in hydraulic fracturing may not be used. In certain embodiments, however, proppant materials may be incorporated and used in the acid fracturing treatment. The initial high viscosity of the acid treatment fluid facilitates the suspension and carrying of proppant materials. This ability will improve the stimulation of formations that contain a smaller portion of acid soluble material where acid etching alone may not provide an adequate flow path for produced fluids. Typically, in acid fracturing is used to treat formations composed of 70% or greater of an acid soluble matrix. Thus, the acid treatment fluid may be used in formations composed of less than 70% of an acid soluble matrix.

Any proppant can be used with the treatment fluid, provided that it is compatible with the acid, the formation, the fluids of the formation, and the desired results of the treatment. Such proppants or gravels can be natural or synthetic, coated, or contain chemicals. More than one type of proppant may be used and can be used sequentially or in mixtures of different sizes or different materials. Proppants and gravels in the same or different wells or treatments can be the same material and/or the same size as one another and the term "proppant" is intended to include gravel in this discussion. In general the proppant used will have an average particle size of from about 0.12 mm to about 2.5 mm, more particularly, but not limited to typical size ranges of about 0.25-0.43 mm, 0.43-0.85 mm, 0.85-1.18 mm, 1.18-1.70 mm, and 1.70-2.36 mm. Various combination of proppant sizes can also be used. Normally the proppant will be present in the slurry in a concentration of from about 0.03 kg proppant added to each liter of treatment fluid to about 3 kg proppant added to each liter of treatment fluid, more particularly from about 0.12 kg proppant added to each liter of treatment fluid to about 1.5 kg proppant added to each liter of treatment fluid.

The proppant materials may include, but are not limited to, ceramic, glass, sand, bauxite, inorganic oxides (e.g. aluminum oxide, zirconium oxide, silicon dioxide, bauxite) materials, lightweight synthetic materials (e.g. polymers, acrylics, resins), naturally occurring materials, or similar materials. Mixtures of proppants can be used as well. The proppant particles may include coated particles formed from an inert, non-deformable core that is completely or substantially coated with a resin coating. The resins may include both pre-cured resin and/or initially uncured resin coatings. The resins used may include, for example, epoxy, phenolic (e.g. phenol formaldehyde), polyurethane elastomers, amino resins, polyester resins, acrylic resins, etc. Examples of resin coated particles are described in U.S. Pat. Nos. 3,929,191, 4,585,064 and 5,422,183, which are each herein incorporated by reference in their entireties. The proppant materials should be compatible with the acid and/or VES used with the fluid.

Fibers or other non-proppant particulate materials may also be included in the acid treatment fluids. These may be used to plug natural fractures so that the treatment fluid will be directed to other areas and/or to facilitate transport of proppant, when proppants are used. The fibers or particulate materials may be straight, curved, bent or undulated. Other non-limiting shapes may include generally spherical, rectangular, polygonal, etc. The particles may be formed from a single particle body or multiple bodies that are bound or coupled together. The particles may be comprised of a main particle body having one or more projections that extend from the main body, such as a star-shape. The particles may be in the form of platelets, disks, rods, ribbons, etc. The particles may also be amorphous or irregular in shape and be rigid, flexible or plastically deformable. Fibers or elongated particles may be used in bundles. A combination of different shaped particles may be used and the particle materials may form a three-dimensional network within the fluid with which they are used. For fibers or other elongated particulates, the particles may have a length of less than about 1 mm to about 30 mm or more. In certain embodiments the fibers or elongated particulates may have a length of 12 mm or less with a diameter or cross dimension of about 200 microns or less, with from about 10 microns to about 200 microns being typical. For elongated materials, the materials may have a ratio between any two of the three dimensions of greater than 5 to 1. In certain embodiments, the fibers or elongated materials may have a length of greater than 1 mm, with from about 1 mm to about 30 mm, from about 2 mm to about 25 mm, from about 3 mm to about 20 mm, being typical. In certain applications the fibers or elongated materials may have a length of from about 1 mm to about 10 mm (e.g. 6 mm). The fibers or elongated materials may have a diameter or cross dimension of from about 5 to 100 microns and/or a denier of about 0.1 to about 20, more particularly a denier of about 0.15 to about 6.

The particulate material may be formed from a degradable material or a non-degradable material. The fibers or particulate material should be compatible with the acid treatment fluids. The materials may be organic or inorganic. Non-degradable materials are those wherein the particulate remains substantially in its solid form within the well fluids. Examples of such materials include glass, ceramics, basalt, carbon and carbon-based compound, metals and metal alloys, etc. Polymers and plastics that are non-degradable in the acid treatment fluid and in the well fluids may also be used as non-degradable particulates. These may include high density plastic materials that are acid and oil-resistant and exhibit a crystallinity of greater than 10%. Other non-limiting examples of polymeric materials include nylons, acrylics, styrenes, polyesters, polyethylene, oil-resistant thermoset resins and combinations of these.

Degradable particulate materials may include those materials that can be softened, dissolved, reacted or otherwise made to degrade within the well fluids. Such materials may be soluble in aqueous fluids or in hydrocarbon fluids. Oil-degradable particulate materials may be used that degrade in the produced fluids. Non-limiting examples of degradable materials may include, without limitation, polyvinyl alcohol, polyethylene terephthalate (PET), polyethylene, dissolvable salts, polysaccharides, waxes, benzoic acid, naphthalene based materials, magnesium oxide, sodium bicarbonate, calcium carbonate, sodium chloride, calcium chloride, ammonium sulfate, soluble resins, and the like, and combinations of these. Particulate material that degrades when mixed with a separate agent that is introduced into the well so that it mixes with and degrades the particulate material may also be used. Degradable particulate materials may also include those that are formed from solid-acid precursor materials. These materials may include polylactic acid (PLA), polyglycolic acid (PGA), carboxylic acid, lactide, glycolide, copolymers of PLA or PGA, and the like, and combinations of these. Such materials may also further facilitate the dissolving of the formation in the acid fracturing treatment.

In many applications, fibers are used as the particulate material, either alone or in combination with other non-fiber particulate materials. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) fibers available from Invista Corp., Wichita, Kans., USA, 67220. Other examples of useful fibers include, but are not limited to, polylactic acid polyester fibers, polyglycolic acid polyester fibers, polyvinyl alcohol fibers, and the like.

The fibers or particulate materials can be formed from or provided with a material that provides tacky or adhesive properties. The adhesive coefficient of the adhesive materials may change, including both a decrease or increase in the adhesive coefficient. The particulate material may have an inherently adhesive surface, or the particulate can be chemically or physically modified to provide the adhesive properties in situ. This may involve providing an adhesive coating on the particulate. The particulate material may be pre-coated or such a coating may be added on the fly as the particulate is added to the introduced well fluid at the surface. The coating or adhesive additive may wet and coat the particulate surface to provide the adhesive properties. In certain instances, a removable non-adhesive coating may be provided on the surface of the particulate, with an adhesive surface underlying the non-adhesive protective coating. The non-adhesive-coating may then be removed to expose the underlying adhesive material.

The fibers or non-proppant particulate materials may be used in an amount of from about 1 to about 15 grams per liter of the treatment fluid, more particularly from about 2 to about 12 grams per liter of treatment fluid, and more particularly from about 2 to about 10 grams per liter of treatment fluid.

The viscous acid mixture may be further modified with the addition of non-miscible fluids or gases, to further enhance rheological properties and/or fluid-loss control. For example the VES gelled acid lends itself readily to creation of a stable foam through the addition of commonly employed gases such as air, nitrogen or carbon dioxide. Stable dispersions of gas at less than 53% by volume, at temperature and pressure conditions, may provide enhanced leak-off control. Proper addition of gas at concentrations above 52% may provide an increase in viscosity by creating a stable foamed fluid.

For example, $CO_2$ at high concentration (high form quality) may be used to slow down the reaction. This may be another mechanism to slow down the reaction of acid and gets more penetration in formation.

The high viscosity acid treatment fluids may have particular use for acid fracturing. In prior methods of acid fracturing, alternate fluids containing formation dissolving materials are typically alternated with non-reactive fluids (non-acid VES-fluids or polymer-based fluids) during the acid fracturing operations. Such alternating of fluids may be eliminated because of the high initial viscosity of the fluid. Alternatively, the high viscosity acid treatment may still be alternated with other non-acid fluids or low viscosity acid fluids.

In performing an acid fracturing treatment, the viscous or gelled acid treatment fluid may be prepared at the surface. The treatment fluid containing the viscoelastic surfactant, rheology enhancer, corrosion inhibitor, optional proppant and/or fibers-particulate, and any other additives is formed with a suitable acid at a concentration to provide the treatment fluid with a pH of ≤0 to provide the high or gelled viscosity. The treatment fluid is introduced into the wellbore and injected into the formation at pressures above the fracturing pressures of the formation. The formation may be a carbonate formation (e.g. limestone and dolomite) formation. The treatment fluids may be polymer- and/or solids free or contain low or minor amounts of polymer or solids material (e.g. less than 0.1% by weight).

In certain embodiments, the VES acid treatment fluid may be used in matrix acidizing treatments as a viscoelastic diverting acid (VDA). In such applications, the VES acid treatment fluid may be introduced at pressures below the fracturing pressure. This may improve the VDA response and leak-off control, particularly in naturally fractured formations, so that less acid leaks down the fracture before spending and viscosifying.

The VES acid treatment fluid provides certain advantages. The high acid, gelled treatment fluid can be used as an acid fracturing fluid without requiring separate stages of gelled and acid fluids. Additionally, the gelled acid fluid is not sensitive to shear, as in conventional polymer-based fluids. Because the treatment fluid is gelled or viscoelastic during pumping, it provides excellent drag reduction, which reduces friction and thus minimizes pumping horse power requirements. This is in contrast to VDA fluids that are non-gelled during the initial pumping stages at high acid concentrations. The gelled acid treatment fluid also allows the inclusion of proppant or other solid or particulate materials, if desired.

Once introduced into the formation, the gelled acid facilitates the formation of fracture and limits the diffusion of the acid to high permeability zone or natural fractures during the fracturing treatment. The gelled acid may also slow down the reaction of the acid with the formation so that it can reach further into the formation. As the acid is spent and the pH reaches the intermediate pH the fluid breaks and acts much like the initial stage of a viscoelastic diverting acid. As the acid is spent further and the pH reaches a pH of from 5 or more, the fluid gels or increases in viscosity again. This diverts the unspent acid portions of the fluid to other areas of the formation where acid treatment may be necessary.

The following examples serve to further illustrate the invention.

EXAMPLES

Example 1

An aqueous VES fluid was formulated using fresh water and the zwitterionic viscoelastic surfactant BET-E-40, available from Rhodia, Inc., which was approximately 40% as active VES, with the remainder being substantially water, sodium chloride, and isopropanol. The BET-E-40 was used in an amount of about 1.5% by weight of the fluid. A polyvinyl alcohol rheology enhancer (Alcotex WD100, available from Synthomer Inc., at 43% hydrolyzed PVA), was used in an amount of about 0.0125% by weight of the fluid. A naphthyl methyl quinolinium chloride corrosion inhibitor was used in an amount of 0.10% by weight of the fluid. Hydrochloric acid was added to the fluid in the amount of 15% by weight of fluid to provide a pH of less than zero.

Figure 1:
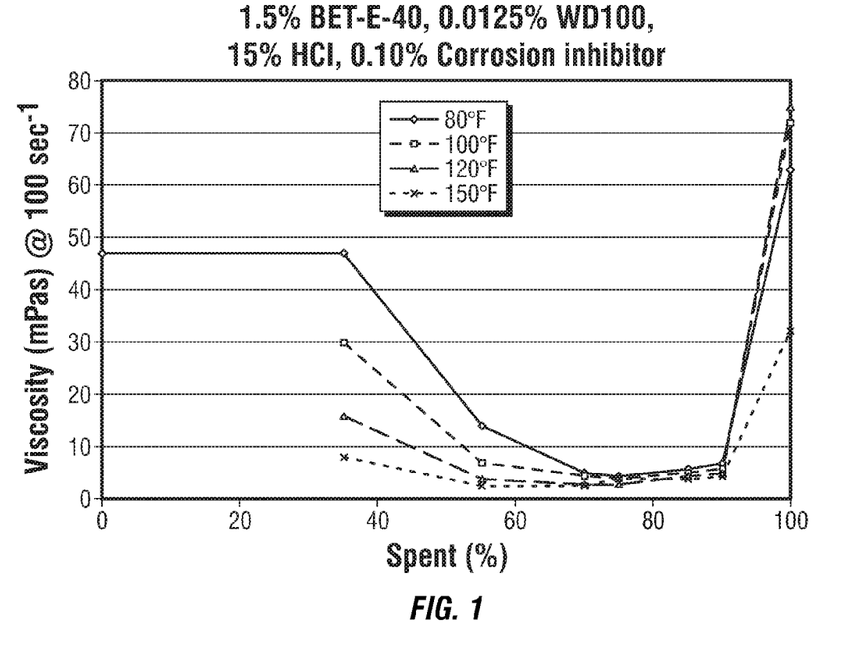
FIG. 1 is a plot of the viscosity of the viscoelastic surfactant acid fluid of Example 1 as the acid is spent at different temperature conditions.

The viscosity of the fluid was measured using a 12 speed Fann 35 viscometer at 60 rpm (100 s$^{-1}$) at different temperatures of 80° F. (26.7° C.), 100° F. (37.8° C.), 120° F. (48.9° C.) and 150° F. (65.6° C.). Approximately 52 ml of the fluid was added to viscometer. An amount of calcium carbonate was added to the fluid to simulate acid reaction with the formation. The viscosity of the fluid was measured with only one measurement as the acid was spent. Each point was a measurement of viscosity corresponding to the acid spending level at different temperatures. Spent acid was calculated based equivalent content of $CaCl_2$ of the fluid. Initially, before spending the fluid will only contain HCl with no $CaCl_2$. When partially spent, the fluid contains a combination of both HCl and $CaCl_2$. When fully spent no HCl is present only $CaCl_2$. During spending, the chloride molar concentration remained constant. The results are shown in FIG. 1.

Figure 2:
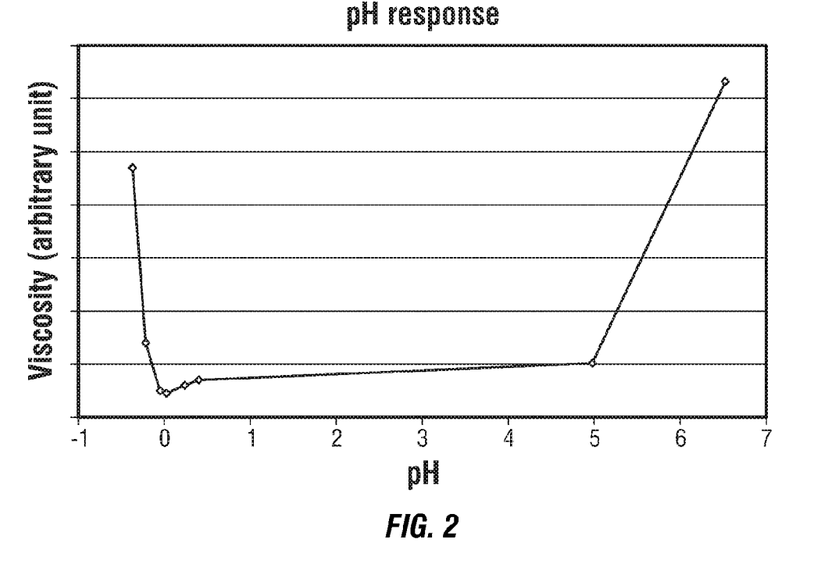
FIG. 2 is a plot of the viscosity versus the pH of the viscoelastic surfactant acid fluid from Example 1.

FIG. 2 shows the pH response for the fluid sample. As can be seen, at very low pH (pH≤0) the fluid has high viscosity. As spending of the acid occurs with about 5% to 0.1% HCl left and the pH of the fluid increases, the fluid has almost no viscosity. As the acid is almost completely spent, the fluid viscosity increases very dramatically. This behavior is different from that of VDA fluids where the fluid has low viscosity at the beginning and increases as the acid is spent.

Example 2

An aqueous VES fluid was formulated using fresh water and the same zwitterionic viscoelastic surfactant BET-E-40 and polyvinyl alcohol rheology enhancer from Example 1. The BET-E-40 was used in an amount of 4.5% by weight of the fluid and the same rheology enhancer was used in an amount of about 0.0375% by weight of the fluid. No corrosion inhibitor was used in the fluid. Hydrochloric acid was added to the fluid in the amount of 15% by weight of fluid to provide a pH of less than zero.

Figure 3:
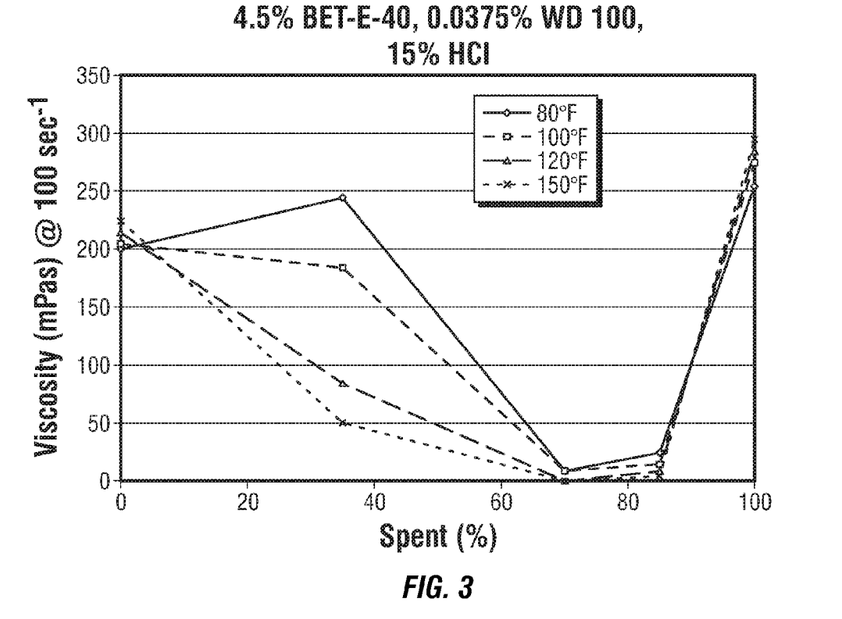
FIG. 3 is a plot of the viscosity of the viscoelastic surfactant acid fluid of Example 2 as the acid is spent at different temperatures conditions.

Viscosity measurements of the prepared fluid were made as in Example 1 at temperatures of 80° F. (26.7° C.), 100° F. (37.8° C.), 120° F. (48.9° C.) and 150° F. (65.6° C.). An amount of calcium carbonate was added to the fluid to simulate acid reaction with the formation. Spent acid was calculated based equivalent content of $CaCl_2$ of the fluid. The fluid viscosity based upon acid spending is shown in FIG. 3.

It was noted that the fluids from Examples 1 and 2 both before and at low acid spending levels had high viscosities, making them good candidates for creating fractures in acid fracturing. Additionally, the fluids were very viscoelastic. It was observed that when pouring the fluids, fluid lips were able to be pulled back after pouring was commenced.

Example 3

Figure 4:
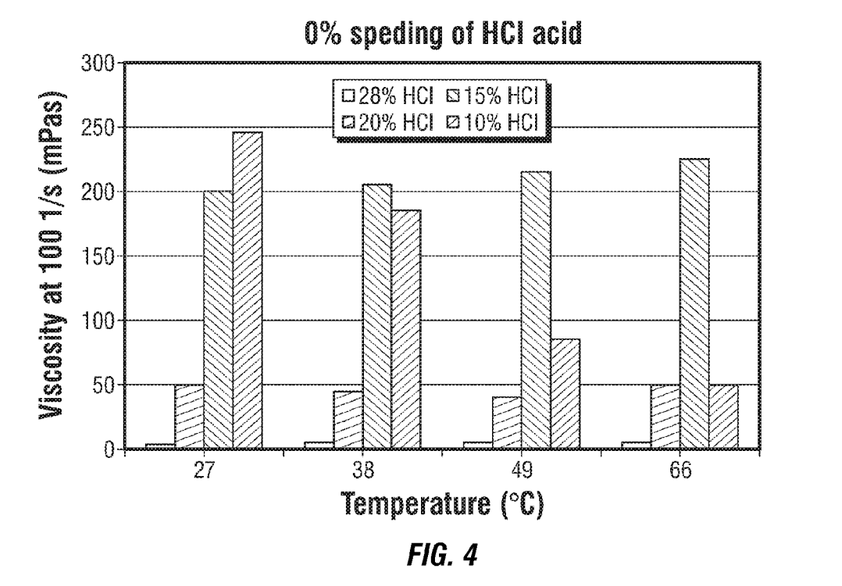
FIG. 4 is a plot of the viscosity versus an unspent viscoelastic surfactant acid fluid from Example 3 at different acid concentrations at different temperature conditions.

An aqueous VES fluid was formulated using fresh water and the same zwitterionic viscoelastic surfactant BET-E-40 and polyvinyl alcohol rheology enhancer from Examples 1 and 2. The BET-E-40 was used in an amount of 4.5% by weight of the fluid and the same rheology enhancer was used in an amount of about 0.0375% by weight of the fluid. No corrosion inhibitor was used in the fluid. Hydrochloric acid concentration in the fluids varied in amounts of 10%, 15%, 20% and 28% by weight. The viscosity of the fluids at the different unspent acid concentrations was then measured using a 12 speed Fann 35 viscometer at 60 rpm (100 s$^{-1}$) at different temperatures of 80° F. (26.7° C.), 100° F. (37.8° C.), 120° F. (48.9° C.) and 150° F. (65.6° C.). The results are presented in FIG. 4.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of treating a wellbore, the method comprising introducing an acid treatment fluid through the wellbore, the treatment fluid comprising from 0.5 to 5.5% by weight of a zwitterionic viscoelastic surfactant, an acid in an amount more than 15% by weight to provide the treatment fluid with an initial pH of ≤0 and a rheology enhancer selected from at least one of a polyvinyl ester, a polyvinyl acetate, a polyacrylate and a sulfonate-containing polymer, and combinations thereof, the zwitterionic viscoelastic surfactant comprises a surfactant or mixture of surfactants having the formula:

RCONH—$(CH_2)_a(CH_2CH_2O)_m(CH_2)_b$—$N^+(CH_3)_2$— $(CH_2)_{a'}(CH_2CH_2O)_{m'}(CH_2)_{b'}COO^-$ wherein R is an alkyl group that contains from about 17 to about 23 carbon atoms which may be branched or straight chained and which may be saturated or unsaturated: a, b, a', and b' are each from 0 to 10 and m and m' are each from 0 to 13, a and b are each 1 or 2 if m is not 0 and (a+b) is from 2 to 10 if m is 0: a' and b' are each 1 or 2 when m' is not 0 and (a'+b') is from 1 to 5 if m' is 0; (m+m') is from 0 to 14; and $CH_2CH_2O$ may also be $OCH_2CH_2$, and, wherein the treatment fluid has a high viscosity at the initial pH and a lower viscosity when the pH of the treatment fluid is raised to an intermediate pH of from greater than 0 to about 5; and wherein: the treatment fluid has at least one property of (1) and (2), wherein (1) is a viscosity at the intermediate pH of less than about 20 mPas at a shear rate of 100 s$^{-1}$, and (2) is the viscosity at the intermediate pH is decreased by as much as 70% or more compared to the high viscosity of the fluid at the initial pH.

2. The method of claim 1, wherein:
the treatment fluid has an increase in viscosity from the low viscosity when the pH of the treatment fluid is raised from the intermediate pH to a pH of from about 5 or more.

3. The method of claim 1, wherein:
the pH is increased to the intermediate pH due to acid spending.

4. The method of claim 1, wherein, the wellbore comprises a subterranean formation and the treatment fluid is introduced into the wellbore at a pressure above the fracture pressure of the formation.

5. The method of claim 1, wherein: the zwitterionic surfactant has the betaine structure:

wherein R is a hydrocarbon group that may be branched or straight chained, aromatic, aliphatic or olefinic and has from about 14 to about 26 carbon atoms and may contain an amine; n=about 2 to about 4; and p=1 to about 5, and mixtures of these compounds.

6. The method of claim 1, wherein:
the treatment fluid has a viscosity of at least 50 mPas at a shear rate of 100 s$^{-1}$ at the initial pH.

7. The method of claim 1, wherein:
the acid is a mineral acid.

8. The method of claim 1, wherein:
the acid is hydrochloric acid.

9. The method of claim 8, wherein:
the hydrochloric acid is present in the treatment fluid in an amount of greater than 20% by weight of the treatment fluid.

10. The method of claim 1, wherein:
the treatment fluid contains at least one of proppant particles, fibers, particulates and a gas component.

11. A method of treating a subterranean formation penetrated by a wellbore, the method comprising introducing an acid treatment fluid through the wellbore into the formation, the treatment fluid comprising from 0.5 to 5.5% by weight of a viscoelastic surfactant, a mineral acid in an amount more than 15% by weight to provide the treatment fluid with an initial pH of ≤0 and a rheology enhancer selected from at least one of a polyvinyl ester, a polyvinyl acetate, a polyacrylate and a sulfonate-containing polymer, and combinations thereof, the viscoelastic surfactant comprising a surfactant or mixture of surfactants having the formula:

wherein R is an alkyl group that contains from about 17 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and CH$_2$CH$_2$O may also be OCH$_2$CH$_2$; and, wherein the treatment fluid is has a high viscosity at the initial pH and a lower viscosity when the pH of the treatment fluid is increased to an intermediate pH of from greater than 0 to about 5; and wherein the treatment fluid has at least one property of (1) and (2), wherein (1) is a viscosity at the intermediate pH of less than about 20 mPas at a shear rate of 100 s$^{-1}$, and (2) is the viscosity at the intermediate pH is decreased by as much as 70% or more compared to the high viscosity of the fluid at the initial pH.

12. The method of claim 11, wherein:
the treatment fluid has an increase in viscosity from the low viscosity when the pH of the treatment fluid is raised from the intermediate pH to a pH of from about 5 or more.

13. The method of claim 11, wherein:
the pH is increased to the intermediate pH due to acid spending.

14. The method of claim 11, wherein:
the treatment fluid is introduced into the wellbore at a pressure above the fracture pressure of the formation.

15. The method of claim 11, wherein: the surfactant has the structure:

wherein R is a hydrocarbon group that may be branched or straight chained, aromatic, aliphatic or olefinic and has from about 14 to about 26 carbon atoms and may contain an amine; n=about 2 to about 4; and p=1 to about 5, and mixtures of these compounds.

16. The method of claim 11 wherein:
the treatment fluid has a viscosity of at least 50 mPas at a shear rate of 100 s$^{-1}$ at the initial pH.

17. The method of claim 11, wherein:
the acid is a mineral acid.

18. The method of claim 11, wherein:
the acid is hydrochloric acid.

19. The method of claim 11, wherein:
the hydrochloric acid is present in the treatment fluid in an amount of greater than 20% by weight of the treatment fluid.

20. The method of claim 11, wherein:
the treatment fluid contains at least one of proppant particles, fibers, particulates and a gas component.

21. A method comprising introducing an acid treatment fluid into a conduit, the treatment fluid comprising from 0.5 to 5.5% by weight of a zwitterionic viscoelastic surfactant, an acid in an amount more than 15% by weight to provide the treatment fluid with an initial pH of ≤0 and a rheology enhancer selected from at least one of a polyvinyl ester, a polyvinyl acetate, a polyacrylate and a sulfonate-containing polymer, and combinations thereof, the zwitterionic viscoelastic surfactant comprises a surfactant or mixture of surfactants having the formula:

wherein R is an alkyl group that contains from about 17 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0: (m+m') is from 0 to 14; and $CH_2CH_2O$ may also be $OCH_2CH_2$, and, wherein the treatment fluid has a high viscosity at the initial pH and a lower viscosity when the pH of the treatment fluid is raised to an intermediate pH of from greater than 0 to about 5; and wherein the treatment fluid has at least one property of (1) and (2), wherein (1) is a viscosity at the intermediate pH of less than about 20 mPas, at a shear rate of 100 $s^{-1}$, and (2) is the viscosity at the intermediate pH is decreased by as much as 70% or more compared to the high viscosity of the fluid at the initial pH.

* * * * *